United States Patent
Ochocinski et al.

(10) Patent No.: US 9,855,819 B2
(45) Date of Patent: Jan. 2, 2018

(54) INTUITIVE PRECONDITIONING INTERFACE

(71) Applicant: Ford Global Technologies, LLC, Dearborn, MI (US)

(72) Inventors: Christopher Adam Ochocinski, Canton, MI (US); Angel Fernando Porras, Dearborn, MI (US); Bryan Michael Bolger, Canton, MI (US); Jordan Mazaira, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/146,594

(22) Filed: May 4, 2016

(65) Prior Publication Data
US 2017/0320373 A1 Nov. 9, 2017

(51) Int. Cl.
*B60H 1/00* (2006.01)
*B60K 35/00* (2006.01)

(52) U.S. Cl.
CPC ......... *B60H 1/00735* (2013.01); *B60K 35/00* (2013.01); *B60K 2350/1004* (2013.01); *B60K 2350/352* (2013.01)

(58) Field of Classification Search
USPC .......................................................... 701/36
See application file for complete search history.

(56) References Cited

U.S. PATENT DOCUMENTS

| | | | |
|---|---|---|---|
| 8,482,535 B2 | 7/2013 | Pryor | |
| 2014/0005847 A1* | 1/2014 | Melen | G06F 1/28 700/291 |
| 2014/0005848 A1* | 1/2014 | Melen | G06Q 10/101 700/291 |
| 2014/0075356 A1* | 3/2014 | Gray | G07C 5/008 715/771 |
| 2016/0124635 A1* | 5/2016 | Covington | G06F 3/04886 345/440 |
| 2016/0263961 A1* | 9/2016 | Treharne | B60H 1/00278 |
| 2016/0267722 A1* | 9/2016 | Schroeder | G07C 5/008 |

OTHER PUBLICATIONS

*Suitable Alternative to Trackbar Control*, Aug. 2012, (5 Pages).
Chris Coyier, *Value Bubbles for Range Inputs*, CSS-Tricks.com, Apr. 2011, (13 Pages).
Brad Colbow, *Slider Nav*, Dribbble, Mar. 2012, (5 Pages).
https://www.pinterest.com/pin/561050066056067258/.

* cited by examiner

*Primary Examiner* — Krishnan Ramesh
(74) *Attorney, Agent, or Firm* — James P. Muraff; Neal, Gerber & Eisenberg LLP

(57) ABSTRACT

A vehicle includes an HVAC system with compressor(s), pump(s), valve(s), chiller(s); a touchscreen and processor(s) configured to: (1) display a preconditioning scheduling interface having line segments; (2) in response to touchscreen tap(s): place points on the segments, cycle the placed points between different kinds of points; and (3) precondition the vehicle via the HVAC based on times associated with the placed points.

18 Claims, 3 Drawing Sheets

INTUITIVE PRECONDITIONING INTERFACE

TECHNICAL FIELD

Systems and methods for scheduling pre-conditioning of a vehicle, such as an electric vehicle, are disclosed.

BACKGROUND

Vehicles, such as electric vehicles, include pre-conditioning systems configured to condition various vehicle components when the vehicle is plugged in to a stable and unlimited source of energy, such as the electrical power grid. Pre-conditioning systems shift energy consumption from the vehicle battery to the power grid, thus improving the driving range of an electric vehicle.

SUMMARY

In some embodiments, the present disclosure relates to a method of preconditioning a vehicle including an HVAC system with compressor(s), pump(s), valve(s), chiller(s), a touchscreen and processor(s). The method includes: displaying a preconditioning scheduling interface having line segments; in response to touchscreen tap(s): placing points on the segments, cycling the placed points between different kinds of points. The method also includes preconditioning the vehicle via the HVAC based on times associated with the placed points.

In some embodiments, the present disclosure relates to a vehicle including an HVAC system with compressor(s), pump(s), valve(s), chiller(s); a touchscreen and processor(s) configured to: display a preconditioning scheduling interface having line segments; in response to touchscreen tap(s): place points on the segments, cycle the placed points between different kinds of points; and precondition the vehicle via the HVAC based on times associated with the placed points.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
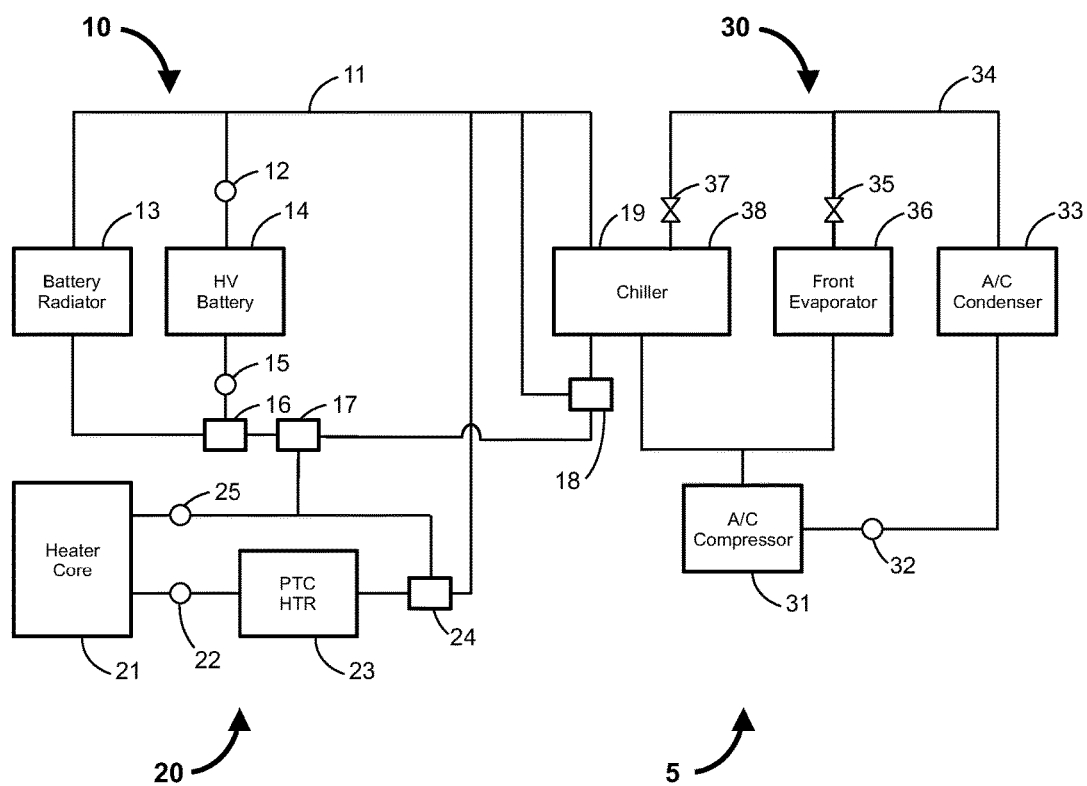
FIG. 1 is an example HVAC system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or".

FIG. 1 shows an example HVAC system 5 of a vehicle, such as a fully electric or partially electric vehicle. The HVAC system 5 is configured to perform preconditioning. The HVAC system 5 includes a first coolant cycle 10, a second coolant cycle 20, and a refrigerant cycle 30. The coolant cycles 10 and 20 are in fluid communication.

The first coolant cycle 10 includes piping 11, a sensor 12, a radiator 13, a heat exchanger 14, a pump 15, three-way valves 16, 17, and 18, and a chiller 19. The radiator 13 releases heat to ambient air. The heat exchanger 14 intakes heat from a high-voltage vehicle battery. In some cases, the high-voltage vehicle battery includes a housing that integrates the heat exchanger 14. In some embodiments, the heat exchanger 14 is a cold plate. In some embodiments, the heat exchanger 14 is a high-voltage battery heat exchanger and includes a cold plate. The pump 15 pumps coolant from the heat exchanger 14 to the first three way valve 16. The three way valves 16, 17, and 18 route coolant. The chiller 19 exchanges heat between coolant in the first coolant cycle 10 and refrigerant in the refrigeration cycle 30.

The second coolant cycle includes the piping 11, a heater core 21, an auxiliary pump 22, a PTC heater 23 (a PTC heater is a kind of electric heater), a fourth three-way valve 24, and a sensor 25. The heater core 21 releases heat to a vehicle cabin. The auxiliary pump 22 pumps fluid from the heater core 21 to the PTC heater 23. The PTC heater 23 heats coolant via electrical resistance. The second three way valve 17 and the fourth three way valve 24 selectively enable fluid communication between the first coolant cycle 10 and the second coolant cycle 20.

The refrigerant cycle 30 includes piping 34, a compressor 31, a sensor 32, a condenser 33, expansion valves 35 and 37, an evaporator 36, and the chiller 38. The compressor 31 compresses refrigerant and motivates the refrigerant toward the sensor 32. The condenser 33 enables heat exchange between the refrigerant and ambient air. The evaporator 36 enables heat exchange between one or more of ambient air and cabin air. The expansion valves 35 and 37 depressurize refrigerant. In some embodiments, the expansion valves 35 and 37 are shutoff and TXV combination valves. In some embodiments, the shutoff components of the expansion valves 35 and 37 are directly upstream of the TXV components. When fully closed, the expansion valves 35 and 37 function as shutoff valves and block refrigerant flow. For example, when expansion valve 35 is fully closed, refrigerant flow to evaporator 36 is blocked. Now all refrigerant flows through chiller 38. The chiller 38 enables heat exchange between refrigerant and coolant. The compressor 31 intakes refrigerant expelled by the chiller 38 and the evaporator 36. In some embodiments, the refrigerant cycle 30 includes a four-way valve (not shown) and associated piping (not shown) configured to reverse the flow through some or all of the components of the refrigerant cycle 30 except for the compressor 31.

One or more HVAC controllers receive measurements from the sensors. In various embodiments, the system includes more sensors than shown in FIG. 1. The system may include at least one sensor directly upstream of each mechanical component. The at least one sensor may be a temperature sensor, a pressure sensor, or both. The HVAC controllers control the activity of one or more of: the pump 15, the auxiliary pump 22, the three-way valves 16, 17, 18, and 24, the PTC heater 23, the compressor 31, and the expansion valves 35 and 37. In some embodiments, the HVAC controllers are the computing system 100 of FIG. 2. In other embodiments, the HVAC controllers in operative communication with the computing system 100 of FIG. 2.

Figure 2:
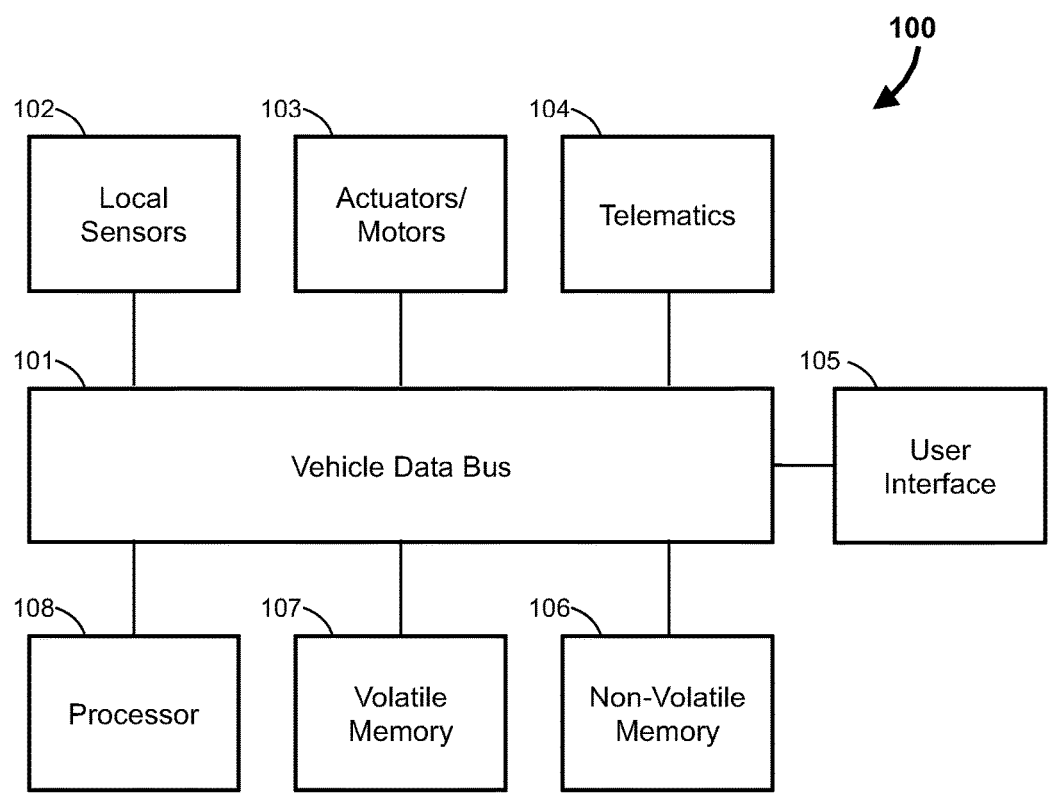
FIG. 2 are example electronic components of a vehicle computing system.

FIG. 2 shows the computing system 100 of the vehicle. The vehicle includes a motor, a battery, at least one wheel driven by the motor, and a steering system configured to rotate the at least one wheel about an axis. The vehicle may be configured to drive the motor with power stored in a battery. The battery can be a chemical battery (e.g., a lithium-ion battery, a lead-acid battery, a nickel metal hydride battery, a zebra battery), an electrical battery (e.g., an ultra capacitor), or a mechanical battery (e.g., a flywheel). Suitable vehicle features are also described, for example, in U.S. patent application Ser. No. 14/991,496, which is hereby incorporated by reference in its entirety.

The computing system 100 enables automatic control of mechanical systems within the device, such as the HVAC system. It also enables communication with external devices such as mobile phones. The computing system 100 includes a data bus 101, one or more processors 108, volatile memory 107, non-volatile memory 106, user interfaces 105, a telematics unit 104, actuators and motors 103, and local sensors 102. It should be appreciated that the external devices may include some or all of these features. It should be appreciated that when this specification refers to the "computing system 100," in some embodiments, it refers to the computing system of the external device, which is in operative communication with the computing system of the vehicle. In other words, a user may perform the disclosed scheduling tasks on a touch-screen display of the mobile device, which then forwards the results to the vehicle.

The data bus 101 traffics electronic signals or data between the electronic components. The processor 108 performs operations on the electronic signals or data to produce modified electronic signals or data. The volatile memory 107 stores data for immediate recall by the processor 108. The non-volatile memory 106 stores data for recall to the volatile memory 107 and/or the processor 108. The non-volatile memory 106 includes a range of non-volatile memories including hard drives, SSDs, DVDs, Blu-Rays, etc. The user interface 105 includes displays, touch-screen displays, keyboards, buttons, and other devices that enable user interaction with the computing system. The telematics unit 104 enables both wired and wireless communication with external processors via Bluetooth, cellular data (e.g., 3G, LTE), USB, etc. The actuators/motors 103 produce physical results. Examples of actuators/motors include fuel injectors, windshield wipers, transmissions, pump motors, compressor motors, valve motors, PTC heaters, airbags, haptic motors or engines etc. The local sensors 102 transmit digital readings or measurements to the processor 108. Examples of suitable sensors include temperature sensors, pressure sensors, pump rotation sensors, compressor rotation sensors, seatbelt sensors, speed sensors, cameras, lidar sensors, radar sensors, etc.

It should be appreciated that the various connected components of FIG. 1 may include separate or dedicated processors and memory. Further detail of the structure and operations of the computing device 100 is described, for example, in U.S. patent application Ser. No. 14/991,496.

The vehicle and/or external device are configured to perform the methods and operations described below in conjunction with the vehicle touch-screen display or the external device touch screen display. In some cases, the vehicle is configured to perform these functions via computer programs stored on the various volatile or non-volatile memories of the computing system 100. In other words, a processor may be configured to perform a disclosed operation when it is in operative communication with memory storing a software program with code or instructions embodying the disclosed operation. Further description of how processors, memories, and programs cooperate appears in U.S. patent application Ser. No. 14/991,496.

Figure 3:
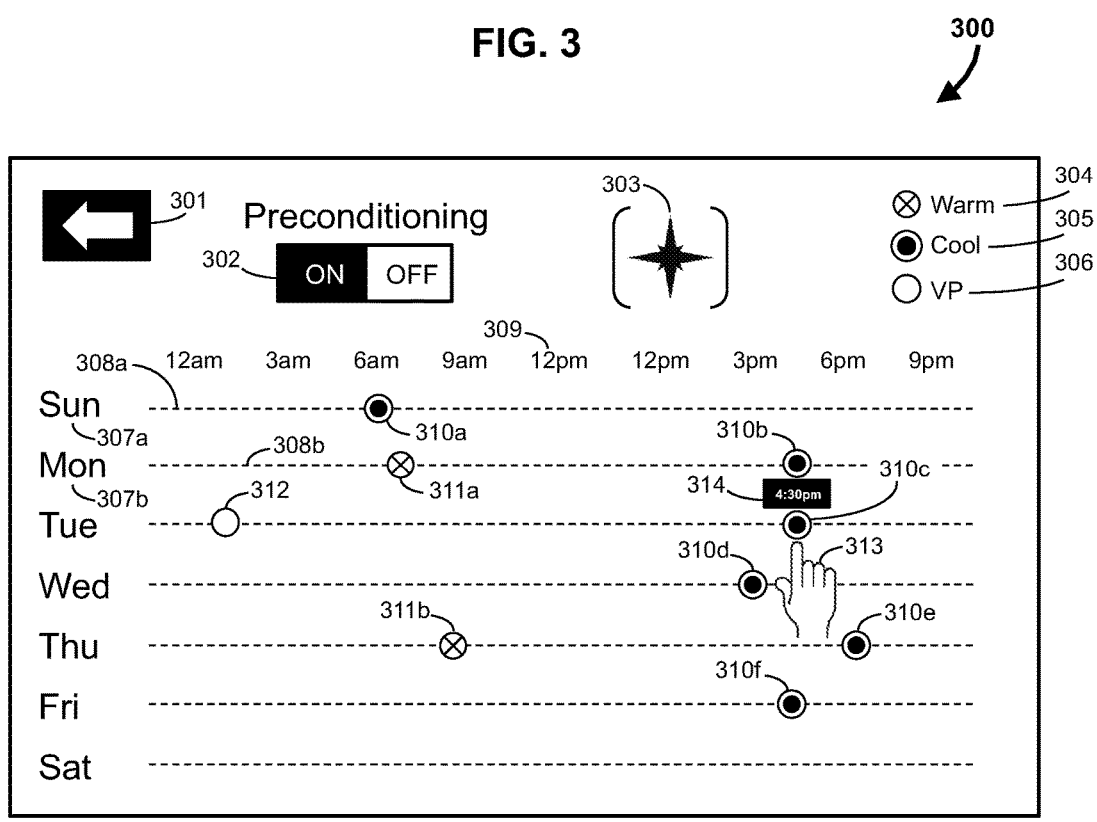
FIG. 3 is an example preconditioning scheduling interface.

FIG. 3 is an example pre-conditioning preconditioning interface 300. The computing system 100 is configured to generate the pre-conditioning interface and display the interface on the touch-screen display of the vehicle. The preconditioning interface 300 includes a navigation icon 301, a preconditioning ON/OFF icon 302, a single-use symbol 303, a warm symbol 304, a cool symbol 305, a vehicle prep symbol 306, a plurality of days 307, a plurality of times 309, and a plurality of scheduling segments 308. These features form a default preconditioning interface. In some embodiments, these features of the preconditioning interface 300 are static.

The example interface of FIG. 3 includes placed or active cool points 310, placed or active warm points 311, a placed or active vehicle prep point 312, and a time-stamp box 314. As explained below, these placed points are dynamic and user-adjustable (i.e., movable, addable, and deletable). Hand 313 represents a user's hand or finger and is not part of the preconditioning interface 300.

The computing system 100 is configured to enable a user to interact with the preconditioning interface 300 via the touch screen display on the vehicle or the mobile device. More specifically, the computing system 100, in conjunction with the touch-screen display, is configured to enable a user to: navigate to other screens via navigation icon 301; enable or disable the preconditioning system via ON/OFF icon 302; place a single-use symbol 303 on the scheduling segments 308 (which becomes a single-use point); place a warm symbol 304 on the scheduling segments 308 (which becomes a warm point 311); place a cool icon on the scheduling segments 308 (which becomes a cool point 310); place a vehicle prep icon 306 on the scheduling interface (which becomes a vehicle prep point 312); slide placed points along the segments 308; remove placed points from the segments; and selectively disable or enable days 307. The computing system 100 instructs the touch-screen display to display suitable animations, which are discussed in greater detail below.

The computing system 100 is configured to control the HVAC system 5 based on the arrangement of the points along the segments 308 in the preconditioning interface 300. More specifically, the user places a point along a scheduling segment 308 corresponding to when the user intends to drive the vehicle. For example, in FIG. 3, the user has placed point 310a at 6 AM on Sunday. The user intends to drive the vehicle at 6 AM on Sunday morning.

The computing system 100 controls the HVAC system 5 according to placed points. Each point causes the HVAC system 5 to complete various tasks by the time associated with the point. The tasks may include: conditioning the cabin interior to a preset temperature; conditioning the vehicle battery to a preset temperature; charging the vehicle battery to full charge or a preset charge; conditioning the coolant to a preset temperature; conditioning the refrigerant to a preset temperature. As discussed below, the HVAC system 5 may only respond to the icons when the vehicle has an active shore power connection (i.e., is plugged into the electrical grid).

The computing system 100 may evaluate the various objectives or functions associated with the placed points and determine whether the sufficient time exists to achieve all of the objectives or functions associated with the placed point. The evaluation process includes finding current ambient temperature (i.e., the temperature of air directly surrounding the vehicle via vehicle temperature sensors), finding current outside air temperature, finding current cabin temperature, finding current battery temperature, finding current battery charge level, and finding electrical grid draw level (e.g., 1400W). The vehicle may apply these measurements to determine when it needs to begin the preconditioning process (e.g., it may take 30 minutes to cool the cabin to 70° F. when ambient is 75° F., 1 hour to cool the cabin to 70° F. when ambient is 90° F., and 2 hours to heat the cabin to 70° F. when ambient is 20° F.). The computing system 100 turns on or activates the components accordingly.

If, for example, the user connected the vehicle to shore power at 5:45 AM on Sunday morning but intended to drive the vehicle at 6 AM on Sunday morning, then there may not be enough time to draw sufficient energy from the electrical grid to fully charge the battery, condition the cabin interior, and condition the battery by 6 AM. If insufficient time exists to achieve the various objectives or functions, then the computing system 100 prioritizes some objectives or functions over others. In some embodiments, the computing system prioritizes reaching at least a predetermined charge level (e.g., 95% charge) as a top priority.

It should thus be appreciated that the preconditioning interface 300 of FIG. 3 enables a vehicle plugged in to shore power to offload energy-intensive tasks to the electrical grid. More specifically, the vehicle anticipates energy intensive tasks such as running the HVAC system 5, and then attempts to achieve those tasks with energy from the electrical grid energy instead of energy from the vehicle battery.

Imagine that cooling the vehicle cabin to 70° F. requires X energy and maintaining the vehicle cabin at 70° F. while driving requires Y energy. Without preconditioning, the vehicle would draw X+Y energy from the vehicle battery, thus depleting the vehicle battery by at least X+Y (likely by more due to energy conversion inefficiencies). If, however, the vehicle pre-conditions the cabin to 70° F., then the vehicle draws the X energy from the electrical power grid instead of from the vehicle battery. Now, the vehicle only needs to draw the Y energy from the vehicle battery, enabling the vehicle to devote the X energy to other tasks, such as powering the wheels. The range of the vehicle is thus extended.

It should thus be appreciated that while preconditioning may enhance user comfort by conditioning the cabin interior, the primary objective of preconditioning is to time-shift energy consumption from a time when the vehicle is in motion and disconnected from the electrical power grid to a time when the vehicle is parked and connected to shore power. This time-shift enables the vehicle battery to devote more energy to primary driving tasks such as providing torque to the wheels and reduces the energy that the vehicle battery must devote to collateral tasks such as conditioning the cabin or cooling the battery. Preconditioning thus extends the driving range of electrical vehicles.

Returning to FIG. 3, the cool points 310 causes the computing system 100 to (a) cool the vehicle to a first preset temperature by the specified time; (b) condition the battery to a second preset temperature by the specified time; (c) fully charge the vehicle battery (or charge the vehicle battery to a preset level) by the specified time. If the preset temperature were 70° F., then cool point 310c would cause the HVAC system 5 to precondition the vehicle cabin to 70° F. by 4:30 PM on Tuesday. The cool points 310 correspond to the cool symbol 305. Cool points 310 are automatically saved. Saved points do not automatically expire after their associated time.

The warm points 311 causes the computing system 100 to (a) heat the vehicle to a third preset temperature by the specified time; (b) condition the battery to a fourth preset temperature by the specified time; (c) fully charge the vehicle by the specified time. If the preset temperature were 72° F., then the warm point 311a would cause the HVAC system to precondition the vehicle cabin to 72° F. by 7 AM on Monday. The warm points 311 correspond to the warm symbol 304. Warm points 311 are automatically saved.

In various embodiments, one or more of the various preset temperatures are determined according to a forecast outdoor air temperature, as received from the vehicle over the Internet. In various embodiments, one or more of the various preset temperature are user-selectable. In various embodiments, the warm points 311 only enable cabin heating such that if the cabin temperature exceeds the third preset temperature, then no cabin heating will be performed. In various embodiments, the cool points 310 only enable cabin cooling such that if the cabin temperature is below the first preset temperature, then no cabin cooling will be performed.

The same concepts may, in some cases, apply to the vehicle battery. In other cases, the battery is conditioned to its predetermined optimal operating temperature. In these cases, the second preset temperature and the fourth preset temperature may be equivalent. In various embodiments, the warm symbol 304 and the cool symbol 305 are combined into a single symbol. Points corresponding to this placed symbol cause the computing system 100 to precondition the vehicle cabin to a predetermined temperature via heating and/or cooling.

The vehicle prep point 312 causes the computing system 100 to prepare the vehicle for driving without conditioning the vehicle cabin. In other words, the vehicle prep point 312 causes the computing system 100 to: (a) condition the battery to a fifth preset temperature by the specified time; (b) fully charge the vehicle battery (or partially charge the vehicle battery to a preset level) by the specified time. It should thus be appreciated that the vehicle prep point 312 enables a user to issue a power-light or energy efficient pre-conditioning. The vehicle prep point 312 corresponds to the vehicle prep symbol 306. Vehicle prep points 312 are automatically saved.

A single use point (not shown) causes the computing system 100 to condition the vehicle cabin without conditioning the battery or charging the battery. The single use point enhances user comfort at the expense of the driving range of the vehicle. The single use point causes the computing system 100 to condition the cabin to a sixth predetermined temperature even if the vehicle is detached from the electrical power grid. The single use point automatically disappears/departs/expires after its selected or associated time and is therefore not saved in perpetuity. The single use point corresponds to the single use symbol 303. In some embodiments, the computing system 100 only considers single use points when the vehicle is connected to shore power. In some embodiments, the computing system 100 only considers (i.e., implements) single use points when the vehicle is disconnected from shore power and/or the battery level is about a predetermined level. In some embodiments, the computing system 100 considers single use points whether or not the vehicle is connected to shore power as long as the battery exceeds a predetermined level or the vehicle is charging. In some embodiments, single use points behave identical to warm points 311 and cool points 310 when the vehicle is connected to shore power, except the single use points expire/disappear/depart after their associated time.

The above disclosure relates to warm points 311, cool points 310, vehicle prep points 312, and single-use points. It should be appreciated that the computing system 100 is configured to enable user-adjustment of these points. In some cases, the computing system 100 enables user-adjustment of these points via user-adjustment of the functions associated with the symbols 303 to 306 matching with the points.

More specifically, the computing system 100 enables user-adjustment of the functions, the various preset temperatures, and the priority levels of the functions. In various embodiments, user adjustment of the symbols and/or points is enabled according to the following table:

| Symbol or Point | | Warm, Cool, VP, User-Select | |
|---|---|---|---|
| Function | Cabin Conditioning | Heat and/or Cool, Only Heat, Only Cool, OFF | Temperature (User Set, Automatic based on Forecast) |
| | Battery Conditioning | Heat and/or Cool, Only Heat, Only Cool, OFF | Temperature (User Set, Automatic based on Forecast) |
| | Coolant Conditioning | Heat and/or Cool, Only Heat, Only Cool, OFF | Temperature (User Set, Automatic based on Forecast) |
| Priorities | Battery Charging Rank (Cabin Conditioning, Battery Conditioning, Coolant Conditioning, and Battery Charging) | Full, User-Selectable Percentage Set Minimum for Each Ranked Item (e.g., Battery 95%) | |
| Residency Conditions | Single-Use, Saved Only When Battery is Charging, Only When Battery > User-Set % | | |

The preceding table represents a range of user-selectable options for each of the symbols or points. If the user adjusts the symbol, then the settings apply to each one of the points associated with the symbol. If the user adjusts a point, then the settings only apply to the adjusted point. In some embodiments, points with different settings than their associated symbol are marked on the touch-screen display with a suitable graphic. Options are separated by commas. In some embodiments, the above chart appears after a suitable user command. The user chooses options in a box by first pressing on the box, then pressing on the desired option. If the desired option requires a value, then a virtual keypad appears enabling the user to enter a value.

The computing system 100 enables user interaction with the preconditioning interface 300 via the touch-screen display. More specifically, the computing system 100 causes the following animations or graphics to be displayed on the user-interface as a consequence of the below-identified user-commands.

When the user presses the ON portion of the ON/OFF icon 302, the computing system 100 brightens (e.g., increases the contrast of) graphics representing the days 307, the times 309, the scheduling segments 308, and any points placed on the scheduling segments 308, such as points 310, 311, and 312. When the user presses the OFF portion of the ON/OFF icon, the computing system grays-out (e.g., reduces the contrast of) graphics representing the days 307, the times 309, the scheduling segments 308, and any points placed on the scheduling segments 308, such as points 310, 311, and 312. The computing system 100 will control the vehicle according to bright points. The computing system will ignore grayed-out points.

The graphics representing the navigation icon, the ON/OFF icon 302, the single-use symbol 303, the warm symbol 304, the cool symbol 305, and the vehicle prep symbol 306 are not affected by the position of the ON/OFF icon. These graphics are always bright. In some embodiments, the user may interact with grayed-out points. In other embodiments, the user may not interact with grayed-out points.

When the user presses and holds a placed point for a first time (i.e., a point placed along one of the segments 308), a time-stamp 314 appears above the point. The time-stamp 314 shows the exact time associated with the point. The user may now slide the point back and forth along the associated segment 308. The time-stamp 314 updates as the point slides. In some embodiments, when a user presses and holds a placed point for a second time exceeding the first time, the option table discussed above appears. In some embodiments, when a user presses and holds a placed symbol for a third time, the option table discussed above appears.

In some embodiments, when the user presses and holds a non-placed symbol 303 to 306, a duplicate of the symbol appears. The user may drag the duplicate symbol to one of the segments to generate a point. In some embodiments, the user can add a point to a segment by touching an area on one of the segments. In these embodiments, a warm point 311 or a cool point 310 will automatically appear at the touched area based on the weather forecast for the day. In some embodiments, the computing system 100 only allows two saved points along each of the segments 308.

When the user taps a point, the point cycles between a warm point 311, a cool point 310, and a vehicle prep point 312. To remove a point, the user presses and holds the point, then drags it away from the segment. The point will disappear when the user's hand lifts from the touch-screen display.

The user can activate and deactivate certain days 307 by tapping on graphic representing the day (e.g., tapping on the "Tue" graphic in FIG. 3). Tapping on the graphic causes the day, the segment, and any points on the segment to gray-out. As stated above, the computing system 100 ignores grayed-out points.

The user applies a single-use set point by dragging the single-use symbol 303 from its position to a desired location on one of the segments 308. A placed single-use point (not shown in FIG. 3) behaves similar to the other placed points, except that a placed single-use point expires and disappears after the time exceeds the time associated with the placed single-use point.

The invention claimed is:
1. A vehicle comprising:
   HVAC with a compressor, pump, valve, and chiller;
   a touchscreen and processor configured to:
      display a preconditioning scheduling interface having one or more line segments;

in response to:
  touchscreen tap(s):
    place one or more points on the one or more line segments,
    cycle the placed points between different kinds of points;
  precondition the vehicle via the HVAC based on times associated with vehicle prep, warm, and/or cool points.

2. The vehicle of claim 1, wherein the processor is configured to: place warm points or cool points, but not vehicle prep points, on empty portions of the segments.

3. The vehicle of claim 2, wherein the processor is configured to: automatically select between the warm points and cool points based on a received temperature forecast.

4. The vehicle of claim 1, wherein the vehicle prep points cause the vehicle to fully charge a battery by associated times, but not precondition a cabin interior.

5. The vehicle of claim 1, wherein the warm points cause the vehicle to fully charge a battery and precondition the vehicle by associated times.

6. The vehicle of claim 1, wherein the cool points cause the vehicle to fully charge a battery and precondition the vehicle by associated times.

7. The vehicle of claim 1, wherein the touchscreen and processor are configured to:
  in response to touchscreen hold:
    slide the placed points along the one or more line segments,
    display a point timestamp,
    remove the placed points.

8. The vehicle of claim 1, wherein the touchscreen and processor are configured to:
  in response to touchscreen hold:
    place single use icons on the one or more line segments, wherein placed single use icons automatically expire.

9. The vehicle of claim 8, wherein the touchscreen and processor are configured to:
  in response to:
    touchscreen tap(s):
      gray-out and disable the one or more line segments and any points resident on the one or more line segments.

10. A method of preconditioning in a vehicle including an HVAC system having a compressor, pump, valve, chiller, touchscreen, and processor, the method comprising, with the processor:
  displaying a preconditioning scheduling interface having one or more line segments;
  in response to touchscreen tap(s):
    placing one or more points on the one or more line segments,
    cycling the placed points between different kinds of points;
  preconditioning the vehicle via the HVAC based on times associated with vehicle prep, warm, and/or cool points.

11. The method of claim 10, wherein the processor is configured to: place warm points or cool points, but not a vehicle prep points, on empty portions of the one or more line segments.

12. The method of claim 11, wherein the processor is configured to: automatically select between the warm points and cool points based on a received temperature forecast.

13. The method of claim 12, wherein the vehicle prep points cause the vehicle to fully charge a battery by associated times, but not precondition a cabin interior.

14. The method of claim 13, wherein the warm points cause the vehicle to fully charge the battery and precondition the vehicle by the associated times.

15. The method of claim 14, wherein the cool points cause the vehicle to fully charge the battery and precondition the vehicle by the associated times.

16. The method of claim 15, wherein the touchscreen and processor are configured to:
  in response to touchscreen hold:
    slide the placed points along the one or more line segments,
    display a point timestamp,
    remove the placed points.

17. The method of claim 16, wherein the touchscreen and processor are configured to:
  in response to touchscreen hold:
    place single use icons on the one or more line segments, wherein placed single use icons automatically expire.

18. The method of claim 17, wherein the touchscreen and processor-are configured to:
  in response to:
    touchscreen tap(s):
      gray-out and disable the one or more line segments and any points resident on the one or more line segments.

* * * * *